US012000308B2

(12) United States Patent
Chaudhari et al.

(10) Patent No.: US 12,000,308 B2
(45) Date of Patent: Jun. 4, 2024

(54) ROTOR BLADE ASSEMBLIES FOR TURBINE ENGINES

(71) Applicant: General Electric Company, Schenectady, NY (US)

(72) Inventors: Vinod Shashikant Chaudhari, Bengaluru (IN); Bhaskar Nanda Mondal, Bengaluru (IN); Thomas O. Moniz, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/893,747

(22) Filed: Aug. 23, 2022

(65) Prior Publication Data

US 2024/0068372 A1 Feb. 29, 2024

(51) Int. Cl.
*F01D 5/30* (2006.01)
*F01D 5/22* (2006.01)

(52) U.S. Cl.
CPC ........... *F01D 5/3053* (2013.01); *F01D 5/225* (2013.01); *F05D 2220/32* (2013.01); *F05D 2240/30* (2013.01)

(58) Field of Classification Search
CPC ........ F01D 11/001; F01D 5/081; F01D 5/082; F01D 11/005; F01D 11/02; F01D 5/06; F01D 9/065; F01D 5/3069; F01D 5/02; F01D 5/022; F01D 5/08; F01D 9/041; F01D 9/042; F01D 5/066; F01D 5/282; F01D 11/127; F01D 21/045; F01D 25/12; F01D 5/085; F01D 5/087; F01D 5/3053; F01D 11/008; F01D 25/243; F01D 5/025; F01D 5/189; F01D 5/225; F01D 5/3046; F01D 5/323; F01D 5/026; F05D 2220/32; F05D 2240/30; F05D 2260/30; F05D 2260/31; F05D 2260/607; F05D 2300/6033; F05D 2260/36; F05D 2230/64
See application file for complete search history.

(56) References Cited

U.S. PATENT DOCUMENTS 2,628,065 A 2/1953 Lombard et al.
2,648,519 A 8/1953 Campini
3,055,633 A 9/1962 Pouit
3,945,758 A * 3/1976 Lee ......................... F01D 5/187 415/115
4,767,271 A 8/1988 Catlow
5,307,622 A * 5/1994 Ciokajlo ................ F02C 3/067 416/128

(Continued)

FOREIGN PATENT DOCUMENTS

EP 3309360 A1 4/2018
EP 3460181 A1 3/2019

*Primary Examiner* — Eric J Zamora Alvarez
(74) *Attorney, Agent, or Firm* — Dinsmore & Shohl LLP

(57) ABSTRACT

A rotor blade assembly for a turbine engine, including an airfoil blade including an inner diameter end and an outer diameter end, a lower blade carrier coupled to the inner diameter end of the airfoil blade and rigidly coupled to a disk via a pin, an upper blade carrier coupled to the outer diameter end of the airfoil blade, and an outer drum coupled to the upper blade carrier via a radial joint. The radial joint supports radial motion of the upper blade carrier relative to an axis extending through a center of the rotor blade assembly.

14 Claims, 7 Drawing Sheets

(56) References Cited

U.S. PATENT DOCUMENTS

| | | | | |
|---|---|---|---|---|
| 6,077,034 | A * | 6/2000 | Tomita ...................... F01D 5/08 | 415/110 |
| 6,152,685 | A * | 11/2000 | Hagi ...................... F01D 11/24 | 415/173.2 |
| 6,217,279 | B1 * | 4/2001 | Ai ......................... F01D 11/001 | 415/110 |
| 6,364,613 | B1 | 4/2002 | Deallenbach et al. | |
| 7,063,505 | B2 | 6/2006 | Czachor | |
| 8,292,580 | B2 * | 10/2012 | Schiavo .................. F01D 9/041 | 416/96 A |
| 8,998,579 | B2 | 4/2015 | Belmonte et al. | |
| 10,794,199 | B2 | 10/2020 | Gaebler et al. | |
| 11,365,629 | B1 * | 6/2022 | Mondal ..................... F01D 1/26 | |
| 2021/0046414 | A1 * | 2/2021 | Gover ................ B01D 46/0045 | |

* cited by examiner

ROTOR BLADE ASSEMBLIES FOR TURBINE ENGINES

TECHNICAL FIELD

The present specification generally relates to rotor blade assemblies and, more specifically, rotor blade assemblies for turbine engines.

BACKGROUND

Vaneless contra-rotating turbines (VCRTs) generally include a high mass rotating drum, which may rotate at a radius larger than a free hoop radius, which may place components within the turbine under stress/strain. While placing a weight, such as a disk, at a smaller radius than the free hoop radius of the drum may provide some relief to the assembly, airfoil blades of the turbine may be caused to compress while the disk is placed in tension, causing additional mechanical stress on the assembly. In addition, the disk may be coupled to the airfoil blades via a flexible joint such as a dovetail joint. However, such joints are inappropriate for certain operating conditions (e.g., thermal/speed reversal) of the VCRT, which may lead to operating inefficiencies.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present disclosure generally relates to rotor blade assemblies such as rotor blade assemblies for a turbine engine (such as a VCRT). For example, the rotor blade assembly may be a rotational assembly of the turbine engine to generate power and/or thrust. Rotor blade assemblies according to the present disclosure may generally include an airfoil blade (such as a plurality of airfoil blades) a lower blade carrier, an upper blade carrier, and an outer drum. For example, the airfoil blade may include an inner diameter end, arranged toward a central axis of the turbine engine and an outer diameter end extending away from the central axis. The lower blade carrier may be coupled to the inner diameter end of the airfoil blade and rigidly coupled to a disk via a pin. The upper blade carrier may be coupled to the outer diameter end of the airfoil blade. The outer drum may be coupled to the upper blade carrier via a radial joint, wherein the radial joint supports radial motion of the upper blade carrier relative to the central axis extending through the center of the rotor blade assembly, maintaining a center alignment between the upper blade carrier and the lower blade carrier during all operating and non-operating conditions. As noted above, the drum may provide a high mass, which rotates at a higher radius than a free hoop radius, which may provide undesirable stresses within a turbine engine. To alleviate the stresses introduced by the rotating drum, the disk, which also rotates at a smaller diameter than the drum, provides a more centrally located mass to balance the movement and stresses introduced by the motion of the drum. The present embodiments may include a rigid connection between the lower blade carrier and the disk through the pin, and may allow for operation of the rotor blade assembly in more strenuous thermal and/or speed conditions, which may not be tolerated by more conventional flexible joints. Using a pinned disk may further allow the rotor blade assembly to meet the Campbell Diagram for Airfoils by providing a more rigid coupling, thereby enabling the airfoils to move with the stiffer pinned disk, as opposed to airfoils moving with the circumferential modes of the flexible outer shroud. As will be described in greater detail herein, embodiments may also provide improved stress profiles through the airfoil blades. For example, the radial joint may allow the airfoil blade to extend and/or retract radially with respect to the outer drum in response to thermal expansion, which may allow for improved system stress management. In further embodiments, integrated cooling channels may provide unique cooling to allow for improved thermal management. These and additional benefits and features will be described in greater detail herein.

Figure 1:
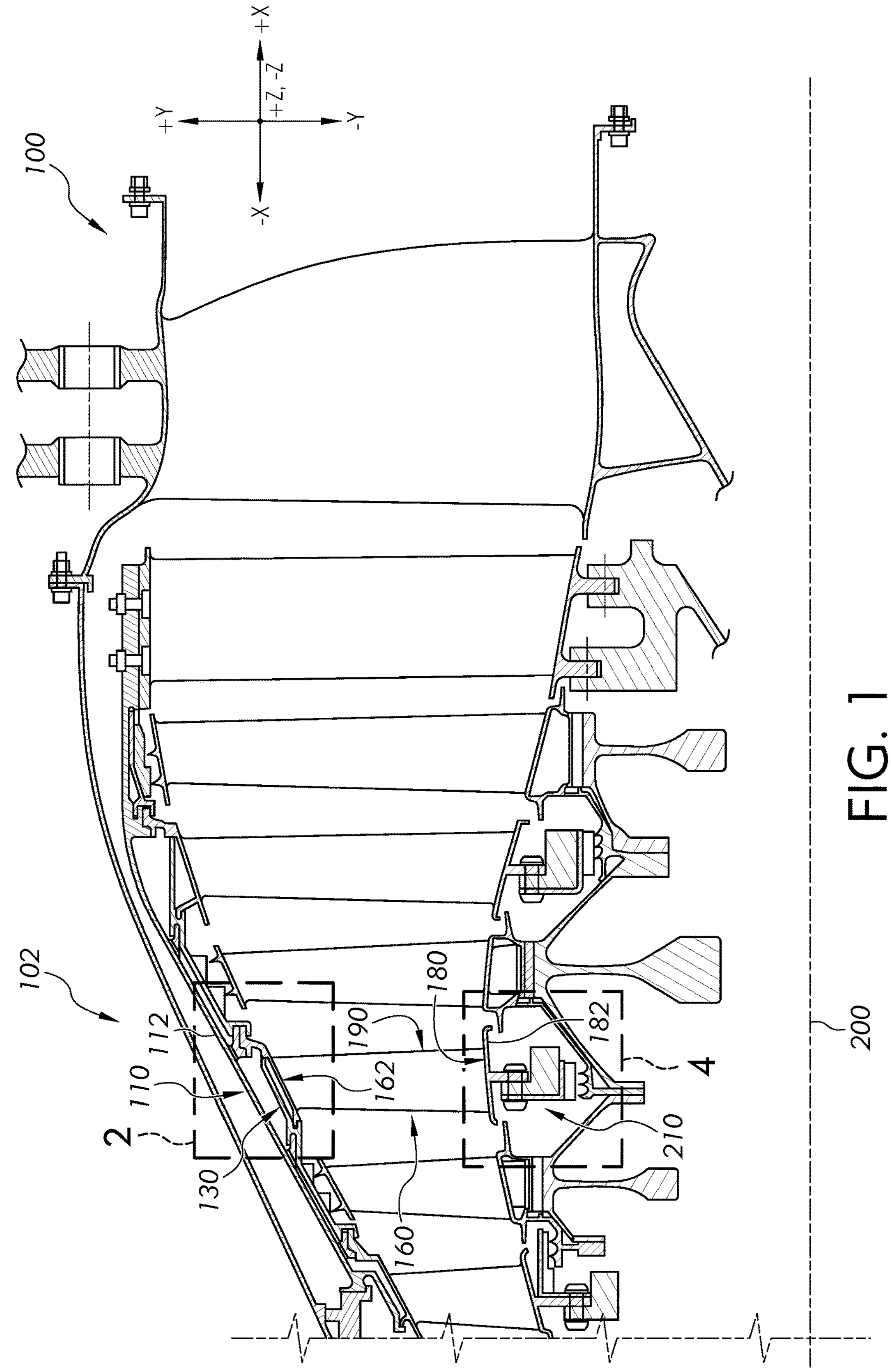
FIG. 1 schematically depicts a partial cross-sectional side view of a turbine engine, according to one or more embodiments shown and described herein.
Figure 2A:
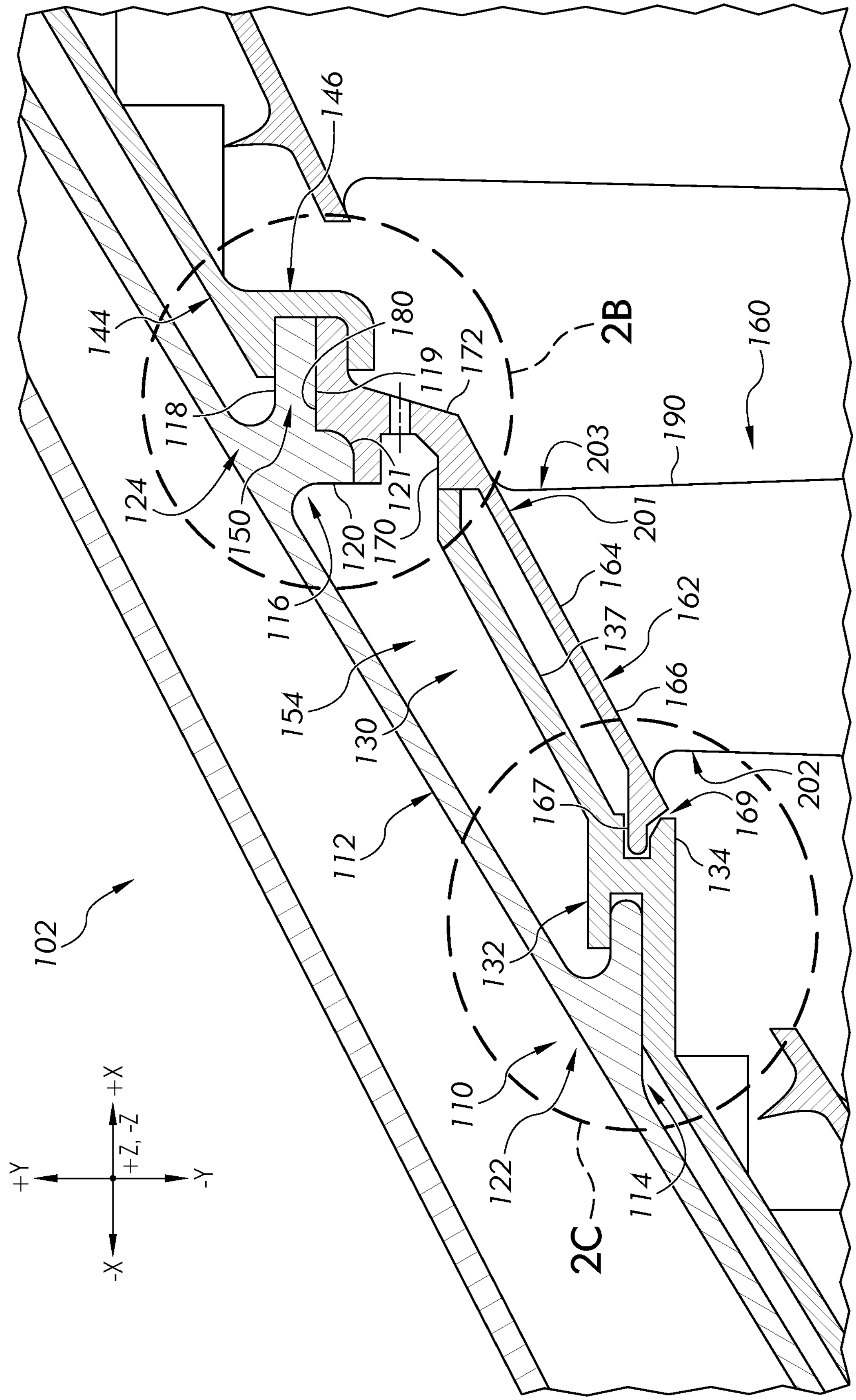
FIG. 2A schematically depicts a more detailed view of an outer shroud, an outer drum, and an upper blade carrier of the turbine engine of FIG. 1, according to one or more embodiments shown and described herein.
Figure 2B:
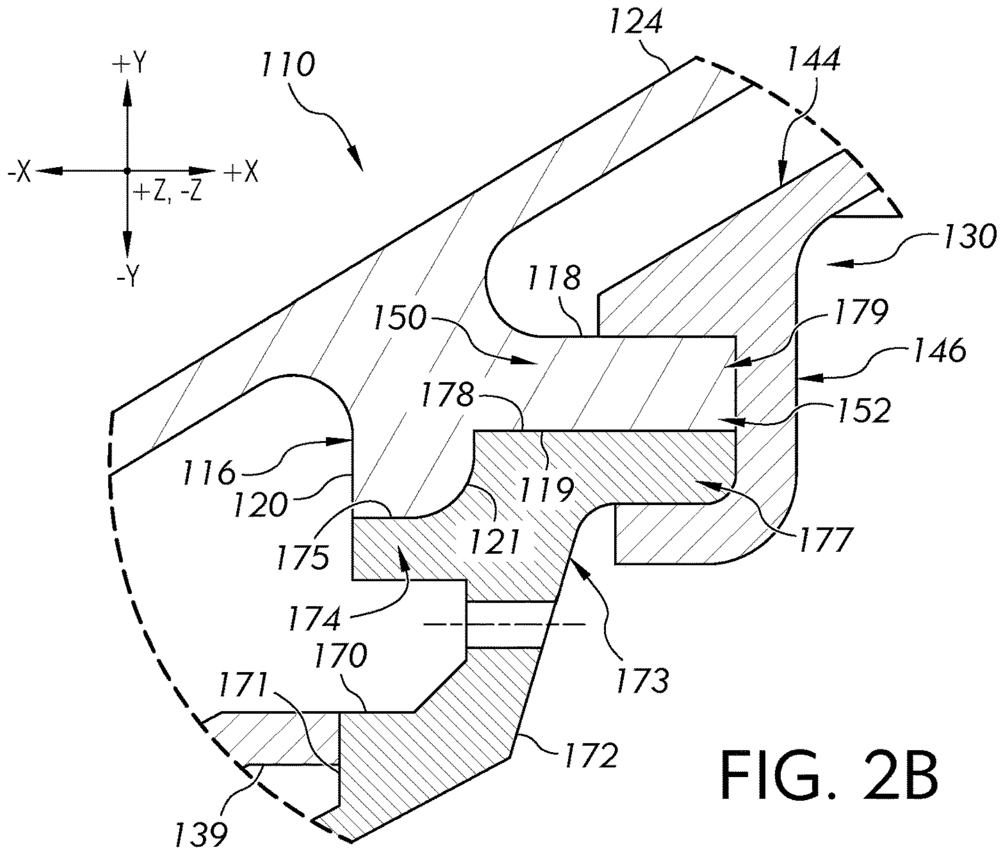
FIG. 2B schematically depicts portion 2B of FIG. 2A in greater detail, according to one or more embodiments shown and described herein.
Figure 2C:
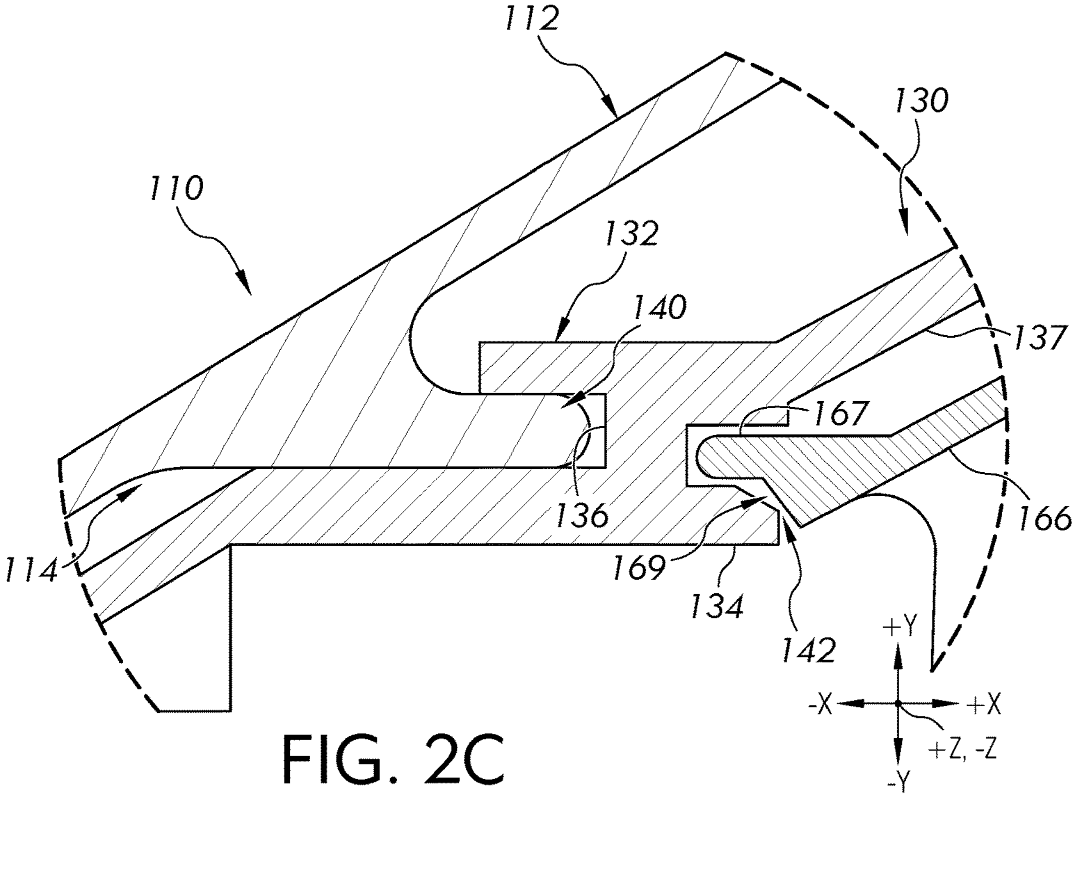
FIG. 2C schematically depicts portion 2C of FIG. 2A in greater detail, according to one or more embodiments shown and described herein.
Figure 3:
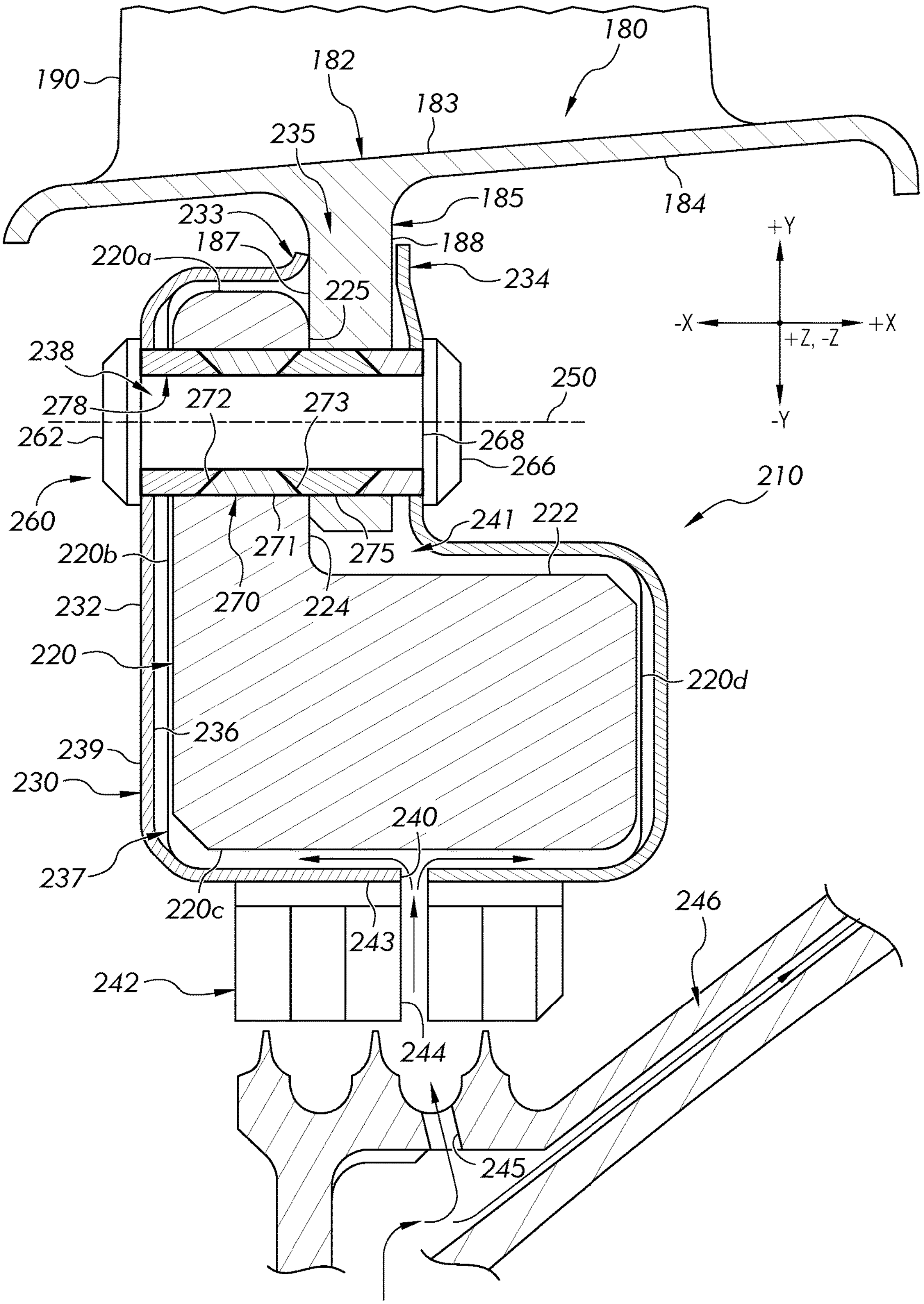
FIG. 3 schematically depicts an inner drum assembly of the turbine engine of FIG. 1, according to one or more embodiments shown and described herein.

As used herein, the term "longitudinal direction" refers to the +/−X directions of the turbine, as depicted, for example, in FIGS. 1-3. The term "radial direction" refers to inward and outward directions transverse to the longitudinal direction (e.g., upwards and downwards in the +/−Y directions of FIGS. 1-3 and/or inward and outward in the +/−Z directions of FIGS. 1-3).

Referring now to FIG. 1, a schematic, partial cross-sectional view of a turbine engine 100 (for example, a VCRT) is illustrated, which may be used in vehicles such as aircraft, watercraft, or the like. The turbine engine 100 may generally include a rotor blade assembly 102, which rotates about a central axis 200. The turbine engine 100 uses combustion gases that flow through the rotor blade assembly 102 to generate power and/or thrust. The rotor blade assembly 102 may include an outer shroud 110, an outer drum 130, an upper blade carrier 162, a lower blade carrier 180, a plurality of airfoil blades 190, and a disk assembly 210. It is noted that a greater or fewer number of components may be included without departing from the scope of the present disclosure.

Still referring to FIG. 1, the outer shroud 110 of the rotor blade assembly 102 may have a body 112 radially circumscribing the central axis 200. By radially circumscribing the central axis 200, the body 112 encloses the outer drum 130, the blade carrier 160, the plurality of airfoil blades (or blades) 190, and/or the disk assembly 210 positioned therein, and may contain and/or guide flow of any combustion gases flowing through the rotor blade assembly 102.

Referring to FIG. 2A, the outer shroud 110 may be coupled to the outer drum 130 at a first location 122 and at a second location 124 longitudinally spaced (e.g., in the +X direction of the depicted coordinate axes) from the first location 122 which collectively may be referred to as the shroud-drum interface. As depicted, the second location 124 may also be radially spaced (e.g., in the +Y direction of the depicted coordinate axes) from the first location 122 such that an outer contour of the body 112 is sloped relative to the +/−X axis of the depicted coordinate axes between the first location 122 and the second location 124.

In embodiments, the outer shroud 110 may include a fore projection 114 located at the first location 122 that extends radially inward (e.g., in the —Y direction of the depicted coordinate axes) and/or longitudinally (e.g., in the +X direction of the depicted coordinate axes) from the body 112 to engage the outer drum 130. An aft projection 116 may extend radially inward (e.g., in the —Y direction of the depicted coordinate axes) and/or longitudinally (e.g., in the +X direction of the depicted coordinate axes) from the body 112 at the second location 124 to engage the outer drum 130. The fore projection 114 provides a mounting structure for mounting the outer drum 130 at the first location 122. The aft projection 116 provides a locating structure for locating the outer drum 130 relative to the upper blade carrier 162. It is noted that the fore projection 114 and the aft projection 116 may extend continuously, circumscribing the central axis 200, or may be intermittent about the central axis 200. In embodiments, the fore projection 114 and the aft projection 116 may be integral with the body 112 or may be coupled to the body 112 (e.g., via fasteners, welding, brazing, or the like).

Referring still to FIG. 2A, the aft projection 116 of the outer shroud 110 may include a spline engagement portion 118 extending longitudinally in the +X direction of the depicted coordinate axes. The spline engagement portion 118 may include an engagement surface 119. The aft projection 116 may further include a carrier engagement portion 120 extending from the spline engagement portion 118 and extending radially inward in the —Y direction of the depicted coordinate axes from the body 112 of the outer shroud 110. The carrier engagement portion 120 may also include a rounded locating surface 121 for engaging and sitting within a centering rabbet 174 of the upper blade carrier 162.

Still referring to FIG. 2A, the outer drum 130 may be arranged radially within the outer shroud 110. Similar to the outer shroud 110, the outer drum 130 may radially circumscribe the central axis 200 (depicted in FIG. 1) and may rotate about the central axis. In embodiments, the outer drum 130 may include a forearm engagement portion 132 and an aft arm engagement portion 144, each for engaging the outer shroud 110 and/or the upper blade carrier 162. The forearm engagement portion 132 and the aft arm engagement portion 144 may be spaced apart from one another along the longitudinal direction (e.g., in the +/−X direction of the depicted coordinate axes) and may also be radially spaced from one another in the +/−Y direction of the depicted coordinate axes, such that the outer drum 130 is sloped relative to the X axis between the forearm engagement portion 132 and the aft arm engagement portion 144. In embodiments, the outer drum 130 may be discontinuous between the forearm engagement portion 132 and the aft arm engagement portion 144 such that an opening 154 or discontinuity is formed within the outer drum 130 between the forearm engagement portion 132 and the aft arm engagement portion 144. Each of the forearm engagement portion 132 and the aft arm engagement portion 144 may define one or more recesses for mounting to the outer shroud 110 and/or the upper blade carrier 162.

Referring still to FIG. 2A, the upper blade carrier 162 may include a hanger body 164 including a forearm extension 166 extending longitudinally from a first side of the hanger body 164 in the —X direction of the depicted coordinate axes, and an aft arm extension 172 extending longitudinally from a second side of the hanger body 164 opposite the first side of the hanger body 164 in the +X direction of the depicted coordinate axes. The forearm extension 166 and aft arm extension 172 may additionally extend radially in the +/−Y direction of the depicted coordinate axes. The upper blade carrier 162 provides structure on an end of the airfoil blades 190 for mounting the airfoil blades 190 to the outer drum 130 and outer shroud 110. The hanger body 164 may extend longitudinally across an outer diameter end 193 of the airfoil blade 190 (e.g., in the +/−X direction) and may be sloped radially (e.g., in the +/−Y direction) such that the forearm extension 166 is positioned radially closer to the central axis 200 than the aft arm extension 172, for example. The forearm extension 166 may extend longitudinally from the hanger body 164 such that the forearm extension 166 extends a distance (e.g., in the −X direction) beyond a first edge 202 of the airfoil blade 190 and the aft arm extension 172 may extend longitudinally from the hanger body 164 such that the aft arm extension 172 extends a distance (e.g., in the +X direction) beyond the second edge 203 of the airfoil blade 190.

Referring now to FIG. 2B, a more detailed view of the aft arm engagement portion 144 is generally illustrated as engaged with both the outer shroud 110 and the upper blade carrier 162. As depicted, the aft arm engagement portion 144 of the outer drum 130 may include a C-shaped mount 146 defining a spline mounting recess 152 for mounting both the outer shroud 110 and the upper blade carrier 162 within a combined joint. For example, an opening 150 of the C-shaped mount 146 may generally open in the —X direction of the depicted coordinate axes. The outer shroud 110 and the upper blade carrier 162 may be received within the C-shaped mount 146 through the opening 150 within the spline mounting recess 152, such that the C-shaped mount 146 couples to and supports the outer shroud 110 and the upper blade carrier 162.

In embodiments and with reference to FIG. 2B, the aft arm extension 172 may be shaped to define a coupling portion 173 that includes a centering rabbet 174, and/or a spline 177 for coupling the aft arm extension 172 to the outer drum 130 and/or the outer shroud 110. For example, the centering rabbet 174 may define a concave surface 175 which provides a recess for receiving a portion of the aft projection 116 of the outer shroud 110 to locate the aft arm extension 172 relative to the outer shroud 110. For example, and as depicted, the rounded locating surface 121 of the carrier engagement portion 120 of the aft projection 116 may be nested or otherwise received within the concave surface 175 to provide of the centering rabbet 174 to aid in aligning the upper blade carrier 162 to the outer shroud 110 for mounting the upper blade carrier 162 to the outer shroud 110 and the outer drum 130. The spline 177 may extend longitudinally (e.g., in the +X direction of the depicted coordinate axes) from the coupling portion 173 of the aft arm extension 172, and may form a splined engagement with at least one of the outer shroud 110 and the outer drum 130. For example, the spline 177 may contact the spline engagement portion 118 of the outer shroud 110, and the spline 177 and spline engagement portion 118 may extend into the spline mounting recess 152 of the C-shaped mount 146 of the outer drum 130. The positioning of the spline 177 and spline engagement portion 118 in the C-shaped mount 146 may restrict movement of the aft arm extension 172 in the radial and longitudinal directions. Restriction of the movement of the aft arm extension 172 provides axial and circumferential positioning of the blade carrier 160 relative to the outer shroud 110. In addition, the positioning of the spline 177 and the spline engagement portion 118 within the C-shaped mount 146 may fix the blade carrier 160 to the outer shroud 110.

Referring now to FIG. 2C, the forearm engagement portion 132 engaged with the outer shroud 110 and the upper blade carrier 162 is schematically depicted in greater detail. The forearm engagement portion 132 may include a first projection 134, a second projection 136 extending radially outwardly (e.g., in the +Y direction) from the first projection 134, and a third projection 137 extending longitudinally (e.g., in the +/−X direction) from the second projection 136. Together, the first projection 134, the second projection 136, and the third projection 137 may define a fore projection mounting recess 140 for mounting the fore projection 114 of the outer shroud 110 to the outer drum 130 and a forearm mounting recess 142 for coupling the upper blade carrier 162 to the outer drum 130. As will be described in greater detail, the forearm mounting recess 142 and the upper blade carrier 162 may be connected via a radial joint 169. The radial joint 169 may support movement of the upper blade carrier 162 in the axial direction (e.g., in the +/−X direction) through movement of the upper blade carrier 162 within the forearm mounting recess 142, or flexibility of the hanger body 164. The radial joint 169 may rigidly connect the hanger body 164 to the body 112 of the outer shroud 110, such that the hanger body 164 and the outer shroud 110 move together radially, while allowing for the hanger body 164 and the outer shroud 110 to move axially independent of one another. Accordingly, during operation and in response to thermal expansion, the radial joint 169 may provide flexibility to allow the airfoil blade 190 to expand axially, thereby reducing the amount of compressive stress experienced by the airfoil blade 190 as compared to the airfoil blade 190 extending between more rigid, conventional couplings.

In embodiments, a portion of the third projection 137 may be angled radially outwardly (e.g., in the +Y direction) and extend alongside the upper blade carrier 162 to a distal end where the third projection 137 may engage the upper blade carrier 162 at an engagement surface 171 of the protrusion 170 defined by the upper blade carrier 162. The engagement between the third projection 137 and the upper blade carrier 162 provides an enclosure to prevent leakage of combustion gases that flow through the rotor blade assembly 102 toward the outer shroud 110, thereby minimizing and/or preventing an increase in temperature of the outer shroud 110 from the combustion gases.

Referring collectively to FIGS. 2A-2C, the upper blade carrier 162 is mounted to an outer diameter end 193 of the airfoil blade 190 (via welding, brazing, fasteners, etc. or is integrally formed therewith). As noted above, the engagement surface 171 of the protrusion 170 may be in contact with the third projection 137. The contact between the aft arm extension 172 at the engagement surface 171 and the third projection 137 may limit the movement of the aft arm extension 172 in the longitudinal direction.

Still referring to FIGS. 2A-2C, the upper blade carrier 162 is coupled to the outer shroud 110, where the concave surface 175 of the centering rabbet 174 complements, and is in contact with, the rounded locating surface 121. The centering rabbet 174 locates the upper blade carrier 162 relative to the outer shroud 110 via contact with the aft projection 116. The spline 177 complements the engagement surface 119 of the aft projection 116 to rigidly couple the upper blade carrier 162 to the outer shroud 110 via a spline joint 179. The C-shaped mount 146 may receive and couple to both the spline 177 and the outer shroud 110. For example, in some embodiments, a splined engagement between the spline 177, and/or another spline, with the outer drum 130 may couple the upper blade carrier 162 to the C-shaped mount 146 of the outer drum 130.

Referring still to FIGS. 2A-2C, the forearm extension 166 may be flexibly coupled to the forearm mounting recess 142. For example, the forearm extension 166 may include a mounting projection 167 sized and shaped to be received within the forearm mounting recess 142 of the outer drum 130 as depicted. The mounting projection 167 may be coupled to the outer drum 130 within the forearm mounting recess 142 via the radial joint 169. The radial joint 169 is configured to support radial motion of the rotor blade assembly 102. The flexibility of the radial joint 169 allows the forearm extension 166 of the upper blade carrier 162 to flex radially (e.g., in the +/−Y direction). The flexibility of the radial joint 169 may be due to a space between the forearm extension 166 and the forearm mounting recess 142, an elasticity of the hanger body 164, or both. For example, the hanger body 164 may be formed of a material to allow the hanger body 164 to elastically deform, or flex (e.g., at the aft arm extension 172), during rotation of the airfoil blade 190. For example, the hanger body 164 may be made of rhenium alloys, titanium alloys, tungsten alloys, molybdenum alloys, or the like. The hanger body 164 may additionally be formed of, for example, superalloys, such as Inconel. In embodiments, the hanger body 164 may be formed integrally with the airfoil blade 190.

Referring now to FIG. 3, similar to the upper blade carrier 162, the lower blade carrier 180 may radially circumscribe the central axis 200 (depicted in FIG. 1). The lower blade carrier 180 may include a lower blade carrier body 182, an outward surface 183 facing radially outward away from the central axis 200, an inward surface 184 facing radially inward toward the central axis 200, and an inner diameter mounting flange 185 extending radially inward toward the central axis 200 from the inward surface 184. The width of the inner diameter mounting flange 185 may be less than a width of the airfoil blade 190 to allow the disk 220 to be coupled to the mounting flange 185 and be positioned between a first edge 202 and the second edge 203 of the airfoil blade 190. The inner diameter mounting flange 185 may include a first surface 187 and an opposite second surface 188. The first surface 187 and the second surface 188 may be arranged generally parallel to one another in the +/−Y direction of the depicted coordinate axes.

Still referring to FIG. 3, the disk assembly 210 may include a disk 220, an encasement 230, and/or a honeycomb seal 242. The disk assembly 210 collectively may be generally ring-shaped, circumscribing the central axis 200 (depicted in FIG. 1).

Still referring to FIG. 3, the disk 220 may include a main body 222 positioned radially inward (e.g., in the —Y direction) of the lower blade carrier 180, and a mounting projection 224 extending radially outward (e.g., in the +Y direction) from the main body 222, so as to be positioned adjacent to and in contact with the inner diameter mounting flange 185. For example, the mounting projection 224 may include a mounting surface 225 that contacts the first surface 187 of the inner diameter mounting flange 185. The mounting surface 225 and the first surface 187 may extend in a substantially parallel arrangement relative to one another in the radial direction (e.g., in the +/−Y direction) to engage one another in a face-to-face relationship. As described above, the rotor blade assembly 102 may rotate at high speeds, putting a load on the airfoil blade 190 and the disk 220. Specifically, high rotation may cause compression of the airfoil blade 190 and tension in the disk 220. The disk 220 may be positioned more radially central to reduce the load on the airfoil blade 190 and disk 220 from rotation of the rotor blade assembly 102. Additionally, by positioning the disk 220 at an inner diameter end of the airfoil blade 190, the size of the disk 220 may be reduced, allowing for smaller disks having reduced weights relative to larger disks positioned adjacent and/or closer to the outer shroud 110. The disk 220 may be made of, for example, rhenium or Inconel superalloys. The disk 220 may additionally be formed of, for example, high specific strength composite ceramics, such as metal matrix composites (MMC) or ceramic matrix composites (CMC).

The encasement 230 may include a curvilinear shell 232 that extends around and substantially encloses a top **220*a*, sides 220*b*, 220*d*, and bottom 220*c* of the disk 220. In embodiments, the curvilinear shell 232 may provide a shield of the disk 220 from ingestion of combustion gases. The encasement 230 may be made of a metal, such as aluminum, steel, copper, brass, or the like. The curvilinear shell 232 may radially circumscribe the central axis 200 (depicted in FIG. 1). The curvilinear shell 232 may include an exterior surface 239 and an interior surface 236 defining an interior channel 241, which houses the disk 220. The curvilinear shell 232 may include two or more portions such as first portion 233 and a second portion 234 which may be coupled to one another. Stated another way, the first portion 233 and the second portion 234 may be separated components, such that the first portion 233 and the second portion 234 may be coupled together with the disk 220 and the mounting flange 185 by a pin 260. In other embodiments, the first portion 233 and the second portion 234 may be coupled to one another via any number of fasteners, welding, brazing, or the like. An opening 235 may be formed between the first portion 233 and the second portion 234 for receiving the mounting flange 185**.

In embodiments, the curvilinear shell 232 may define at least one airflow bore 240 extending therethrough, which allows for air or other gasses to flow through an airflow cavity 237. The airflow bore 240 may be formed on a radially inward facing surface 243 (e.g., facing the central axis 200 depicted in FIG. 1). The airflow cavity 237 may be defined by a spacing between the interior surface 236 of the curvilinear shell 232 and the disk 220 and/or the interior surface 236 and the mounting flange 185.

Still referring to FIG. 3, the honeycomb seal 242 may be a honeycomb structure, including a lattice of hexagonal, hollow bodies, such as, for example, a labyrinth seal honeycomb as is generally understood. Alternatively, the honeycomb structure may be a lattice of any shape(s), including triangles, rectangles, etc. Unlike conventional honeycomb seals, the honeycomb seal 242 may include a channel 244 extending therethrough in the radial outward direction (e.g., in the +Y direction). The honeycomb seal 242 may be coupled to the encasement 230 (e.g., via one or more fasteners, adhesives, welding, brazing, or the like), where the channel 244 is aligned with the airflow bore 240 formed in the interior surface 236, such that the honeycomb seal 242 is positioned at an end of the airflow path 191.

In embodiments, the turbine 100 includes an inner rotor 246 positioned radially inward of the disk 220. The inner rotor 246 may include a channel 245 formed therein, the channel 245 being positioned adjacent to the channel 244 in the honeycomb seal 242 and the airflow bore 240 of the curvilinear shell 232. The channel 245 in the inner rotor 246 may be aligned with the channel 244 in the honeycomb seal 242 and the airflow bore 240 of the curvilinear shell 232 such that, during rotation of the inner rotor 246, air is moved radially outward by the inner rotor 246 through the channel 245 in the inner rotor 246. Air flowing through the channel 245 in the inner rotor 246 flows radially outward to the channel 244 in the honeycomb seal 242 and through the airflow bore 240, where the airflow enters into the airflow cavity 237, providing cooling to the disk assembly 210.

Referring still to FIG. 3, a first mounting bore 238 may be defined by and extend through the first portion 233 and the second portion 234 of the curvilinear shell 232, the mounting flange 185, and the mounting projection 224 of the disk 220. The first mounting bore 238 is configured to receive the pin 260 and the self-locking assembly 270. A common axis 250 may extend through, and be defined by, the center of the first mounting bore 238.

The pin 260 may include a head 262, an end cap 266, and a shank 268 coupled to and extending between the head 262 and the end cap 266. The shank 268 may define a longitudinal axis extending along the common axis 250. In embodiments, the pin 260 may be a conventional nut and bolt, where the shank 268 is threaded, and the end cap 266 is a nut that couples to the shank 268 via complementary threads. However, the pin 260 may include the head 262 and end cap 266 coupled to the shank 268 by a joining process, such as, but not limited to, welding, brazing, soldering, fastening, riveting, or bonding.

The pin 260 may further include a self-locking assembly 270. The self-locking assembly 270 may circumferentially surround the shank 268 of the pin 260. The self-locking assembly 270 may include a plurality of cylindrical locking components. The plurality of locking components may define a second mounting bore 278 extending therethrough. The plurality of locking components may be interlocking, where each locking component includes an angled surface that complements the angle of the surface of the adjacent locking component(s) such that adjacent locking components overlap one another.

The plurality of locking components may include any number of locking components, such as a first locking component 271, a second locking component 275, etc. (e.g., at least two locking components, at least three locking components, at least four locking components, etc.) arranged along the common axis 250. The plurality of locking components may be made of a compressible material, such as aluminum, resin, polymer, hard plastics, elastomers, or the like. Each of the locking components may include a first angled surface 272 and/or a second angled surface 273 that is angled in an opposite direction to the first angled surface 272. The first angled surface 272 and second angled surface 273 may be oblique to the common axis 250. The angled surfaces may extend in the radial and longitudinal directions (e.g., in the +/−X direction, and +/−Y direction), and are angled to complement the angle of the adjacent locking component. Accordingly, the angled surfaces of adjacent locking components engage one another in an overlapping configuration. The overlapping configuration allows the locking components to lock together, where the coupling of the head 262 and end cap 266 to the shank 268 compresses the locking components, thereby rigidly coupling the pin 260 within the second mounting bore 278. In other words, the locking components rigidly couple the pin 260 to the disk assembly 210. The rotor blade assembly 102 may produce vibration during rotation. The high rotational speeds of the rotor blade assembly 102 may produce a large amount of vibration that may cause unwanted stresses to the various components in the rotor blade assembly 102. The rigid coupling of the disk assembly 210 to the lower blade carrier 180 reduces the vibration of the rotor blade assembly 102 during rotation. The rigid coupling of the disk assembly 210 to the lower blade carrier 180 provides a further benefit of loading the centrifugal load on the disk assembly 210, while the coupling between the airfoil blades 190 and the outer shroud 110 prevent axial movement of the disk assembly 210 along with the airfoil blades 190 relative to the outer shroud 110. In addition, the rigid coupling of the disk assembly 210 to the lower blade carrier 180 allows for radial flexibility by reducing radial loads to the outer shroud 110 by transferring minimum radial loads into the outer shroud 110.

The locking components 271, 275 may engage the pin 260 to the first mounting bore 238. When the locking components 271, 275 are assembled, the end cap 266 may apply a force to the locking components 271, 275 in the longitudinal direction (e.g., in the +/−X direction). The angled surfaces transfer the force radially inward and outward from the common axis 250, thereby compressing at least one of the plurality of locking components against the first mounting bore 238, and compressing at least one of the plurality of locking components against the shank 268 of the pin 260. The compression of the plurality of locking components against the first mounting bore 238 and the pin 260 engages the pin 260 to the first mounting bore 238, and rigidly couples the disk assembly 210 to the blade carrier 160 at the lower blade carrier 180.

It is noted that while one pin is illustrated coupling the disk assembly 210 to the lower blade carrier 180, there may be a plurality of pins coupling the disk assembly 210 to the lower blade carrier 180, as described above. For example, a plurality of pinned connections may be arranged circumferentially about the central axis 200.

Referring again to FIG. 3, some embodiments may include four locking components. However, in embodiments, the plurality of locking components may include any number of locking components, such as two locking components, three locking components, four locking components, etc. In embodiments, the angle of the angled surfaces 272, 273 of the locking components may include an angle relative to the common axis 250 in a range of, for example, about 10° to about 80°, and about 100° to about 170°, respectively, and, more specifically in some embodiments, in a range of about 30° to about 60°, and about 120° to about 150°, respectively.

As noted above, the pin 260 may rigidly couple the disk assembly 210 to the lower blade carrier 180. The head 262 and end cap 266 may include a diameter that is larger than the diameter of the first mounting bore 238, where the head 262 and end cap 266 contact opposing sides of the curvilinear shell 232 to lock the various components of the disk assembly 210 to the lower blade carrier 180. The plurality of locking components may include a diameter that is sized to fit within the diameter of the first mounting bore 238 when the locking components are not under compression. The second mounting bore 278 defined by the locking components may include a diameter sized to receive the shank 268 of the pin 260 and the locking components 271, 275, where the plurality of locking components 271, 275 are sandwiched between the pin 260 and the first mounting bore 238.

Figure 4:
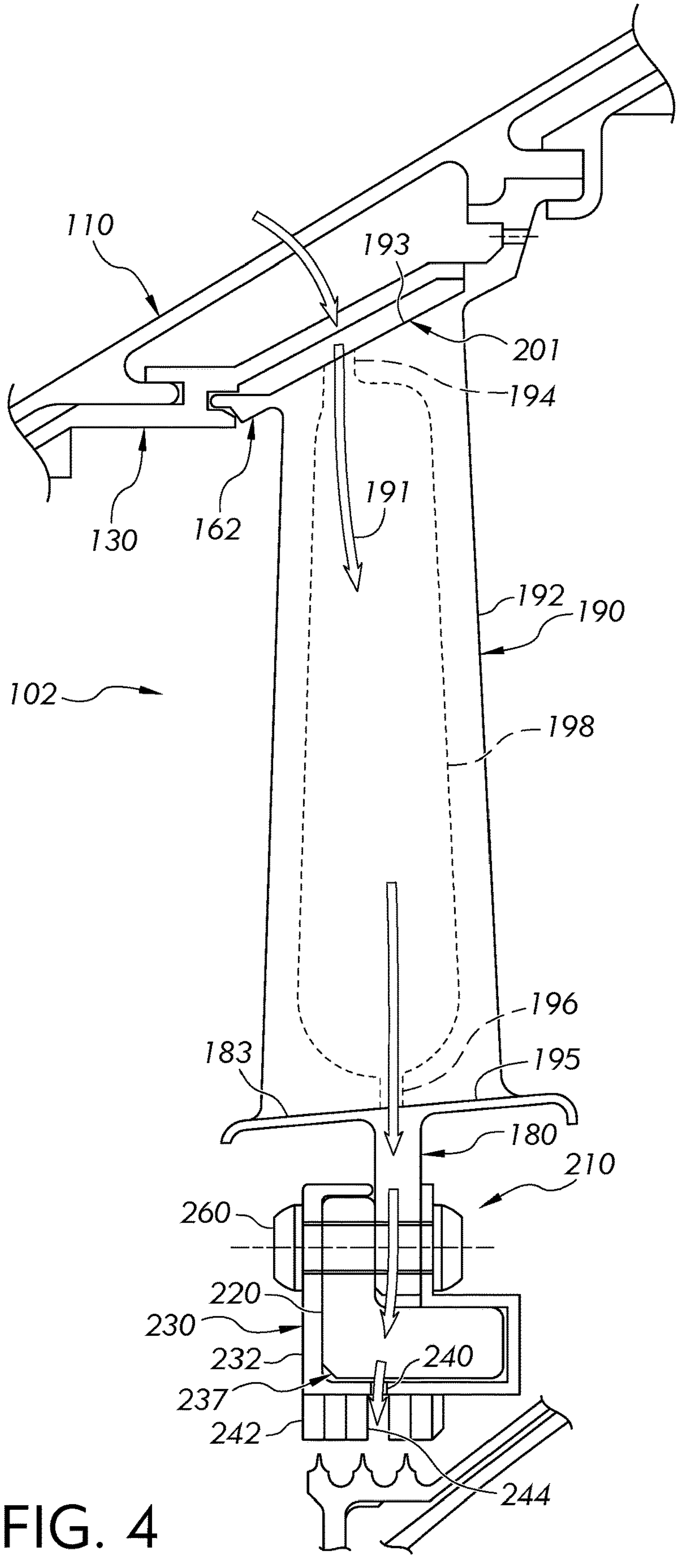
FIG. 4 schematically depicts a rotor blade assembly of a turbine engine, according to one or more embodiments shown and described herein.

Referring now to FIG. 4, the plurality of airfoil blades 190 may each include an elongated body 192 with an outer diameter end 193 and an inner diameter end 195. The plurality of airfoil blades 190 may be arranged in a ring about the central axis 200 (shown in FIG. 1) such that the inner diameter end 195 refers to the end of the plurality of airfoil blades 190 arranged in closer proximity to the central axis 200 and the outer diameter end 193 refers to the end of the plurality of airfoil blades 190 arranged farther away from the central axis 200. The outer diameter end 193 may be coupled to the upper blade carrier 162, where the elongated body 192 extends radially inward (e.g., in the —Y direction) from the upper blade carrier 162. The inner diameter end 195 may be coupled to the outward surface 183 of the lower blade carrier 180. In embodiments, each of the plurality of airfoil blades 190 may be formed as a monolithic piece with the upper blade carrier 162 and/or lower blade carrier 180. In embodiments, each of the plurality of airfoil blades 190 may be coupled to the upper blade carrier 162 and/or lower blade carrier 180 by any conventional joining process, such as, but not limited to, welding, brazing, soldering, or bonding.

Each airfoil blade 190 may define a first opening 194 formed therein at the outer diameter end 193, a second opening 196 formed therein at the inner diameter end 195, and a cooling channel 198 extending internally through the airfoil blade 190 between the first opening 194 and the second opening 196 in the radial direction (e.g., in the +/−Y direction). The first opening 194, second opening 196, and cooling channel 198 may be in fluid communication, and define an airflow path 191 that extends radially (e.g., in the +/−Y direction) through the airfoil blade 190. The airflow path 191 may be further defined by the airflow cavity 237 between the curvilinear shell 232 and the disk 220, and the channel 245 formed in the inner rotor 246 so that the airflow path 191 may extend around the disk 220 and extend radially inward through both the curvilinear shell 232 and the inner rotor 246.

Still referring to FIG. 4, the airflow path 191 allows air or other gasses to move from the outer shroud 110 through the disk assembly 210, where rotation of the turbine engine 100 draws air into the first opening 194, and the air moving along the airflow path 191 moves through the cooling channel 198 and out of the second opening 196. The air exiting the second opening 196 may flow between the encasement 230 and the disk 220 via the airflow cavity 237. A flow of air or other gasses along the airflow path 191 may provide cooling and a lower temperature gradient to the rotor blade assembly 102. The increased cooling from the airflow path 191 may allow the turbine engine 100 to operate at a higher temperature and/or a higher rotational speed.

Figure 5:
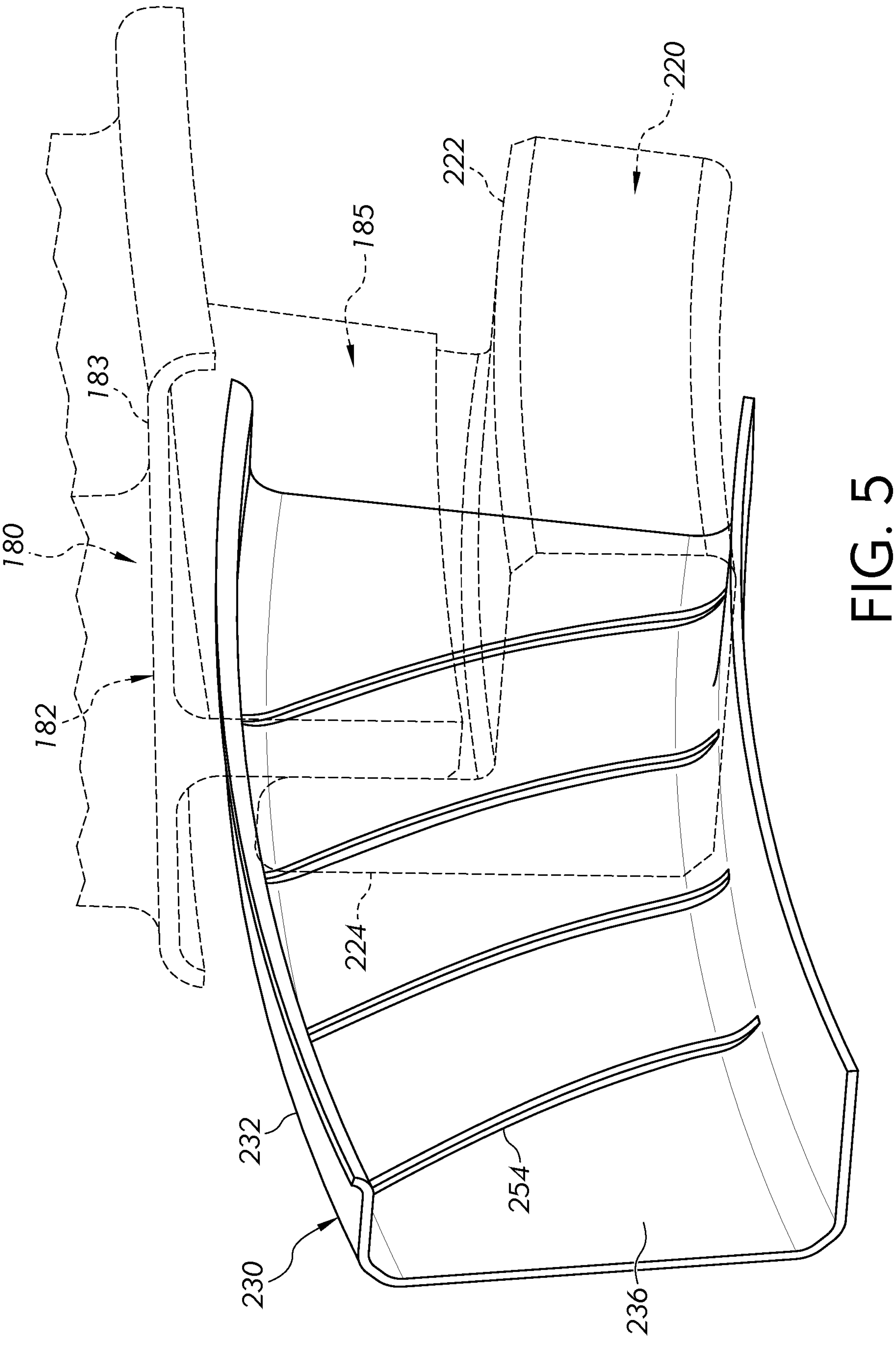
FIG. 5 schematically depicts an isometric view of an inner drum assembly including an encasement, according to one or more embodiments shown and described herein.

Referring to FIG. 5, in some embodiments the curvilinear shell 232 may include a plurality of fins 254 extending from the interior surface 236 of the curvilinear shell 232 into the airflow cavity 237. The plurality of fins 254 may extend along the interior surface 236 in the radial direction (e.g., in the +/−Y direction). In some embodiments, the plurality of fins 254 may be obliquely angled relative the +/−Y and/or +/−Z directions of the depicted coordinate axes. The plurality of fins 254 may extend from the interior surface 236 toward the disk 220 a distance less than a distance between the interior surface 236 and the disk 220. In some embodiments, the plurality of fins 254 may instead, or in addition to the plurality of fins 254 on the curvilinear shell 232, extend from the disk 220. In such embodiments, the plurality of fins 254 on the encasement 230 may increase the amount of heat dissipated from the encasement 230. For example, the plurality of fins 254 may increase the amount of heat dissipated from the disk assembly 210 by increasing the surface area of the interior surface 236 of the curvilinear shell 232 exposed to the airflow cavity 237. In embodiments, the plurality of fins 254 may act to guide or pump air flow to the airfoil blade 190.

Referring again to FIG. 4, the airflow through the encasement 230 exits the airflow bore 240 of the curvilinear shell 232, and is directed through the channel 244 of the honeycomb seal 242. Specifically, the airflow may be directed around the disk 220 in the airflow cavity 237 of the curvilinear shell 232. The airflow may pass through channel 244 and exit the channel 244 in the lateral direction (e.g., in the +/−X direction). The honeycomb seal 242 acts to regulate the airflow exiting the encasement 230, thereby increasing the amount of airflow through the disk assembly 210. Specifically, the honeycomb seal 242 reduces the amount of airflow exiting the channel 244 in the lateral direction. In some embodiments, airflow may instead flow in the opposite direction than the direction that is depicted in FIG. 4. For example, air may enter the rotor blade assembly 102 through the channel 244 of the honeycomb seal 242, flowing through the disk assembly 210 and lower blade carrier 180, and out of the first opening 194 in the airfoil blades 190.

In some embodiments, it is noted that instead of or in addition to the curvilinear shell 232, air flow passages may extend radially through the disk 220. For example, an air flow channel may be defined through the disk 220 itself, which may be fluidically coupled to the cooling channel 198 for the airfoil blade 190 and to the channel 244 of the honeycomb seal 242.

Figure 6:
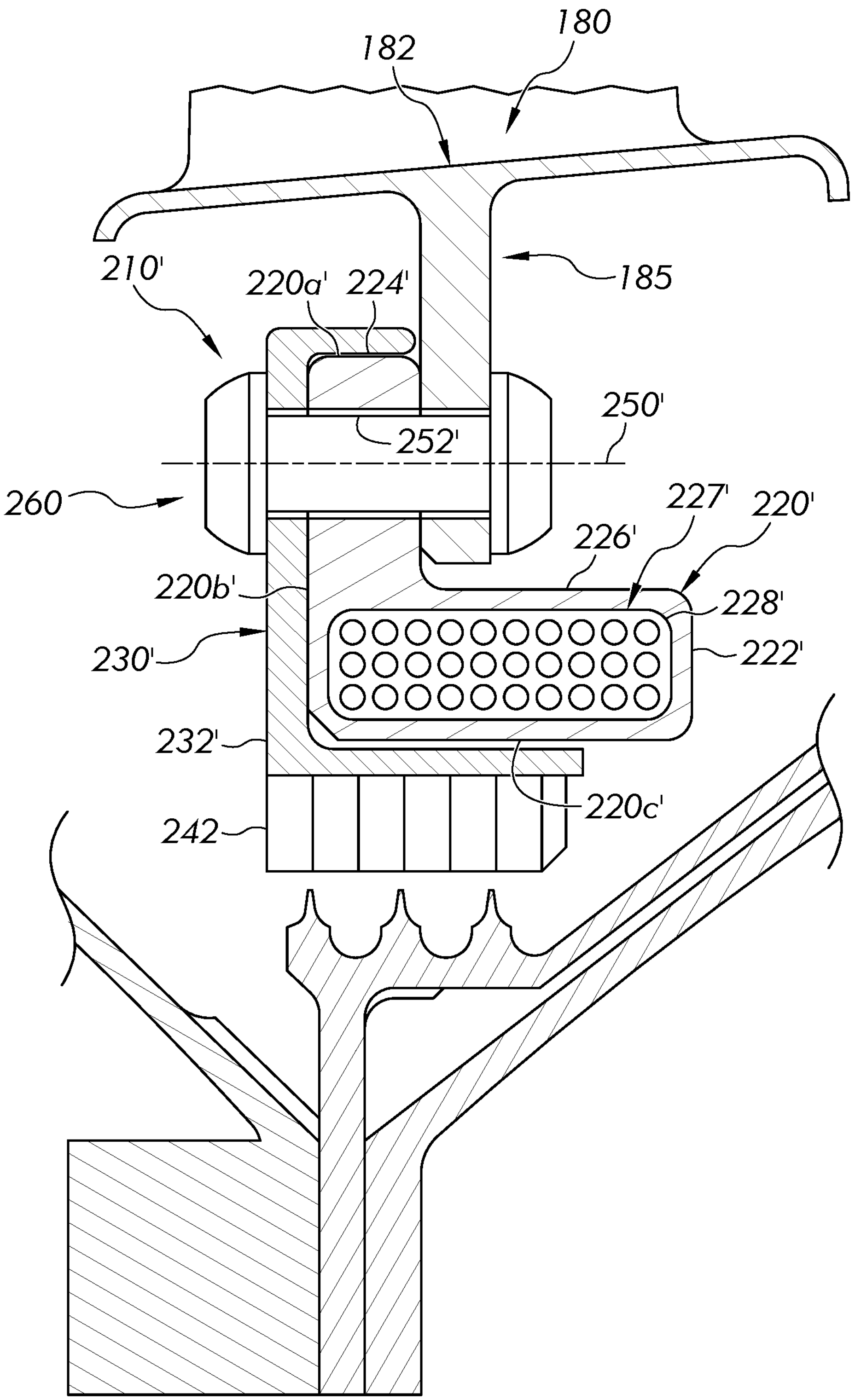
FIG. 6 schematically depicts another embodiment of an inner drum assembly, according to one or more embodiments shown and described herein.

Referring now to FIG. 6, an alternative disk assembly 210' is schematically illustrated. It should be appreciated that the alternative disk assembly 210' is similar to the disk assembly 210 discussed above. Accordingly, the above description is applicable to the present embodiment, unless otherwise noted or apparent. As such, the alternative disk assembly 210' includes a disk 220' having a main body 222', and a mounting projection 224' extending radially outward (e.g., in the +Y direction) from the main body 222', and an encasement 230'.

The encasement 230' may include a curvilinear shell 232' that extends around a top **220*a*', side 220*b*', and bottom 220*c*' of the disk 220'. In the depicted embodiment, the curvilinear shell 232' may be in contact with the disk 220'. Additionally, and as depicted, the curvilinear shell 232' may not extend around the entirety of the alternative disk assembly 210' as in the embodiment described above. However, it is contemplated that the curvilinear shell 232' may encase the disk 220'** and may provide a cooling cavity as described above.

A bore 252' may be defined by and extend through the mounting projection 224' and the curvilinear shell 232', and circumferentially surrounds a common axis 250'. The alternative disk assembly 210' is coupled to the lower blade carrier 180 via the pin 260 extending through the bore 252'. Though not shown, the alternative disk assembly 210' may include the plurality of locking components described above.

The disk 220' may be formed of or contain a metal matrix composite 228' positioned within the main body 222', where the metal matrix composite 228' may include an array of fibers that are wound about the central axis 200 (depicted in FIG. 1). The metal matrix composite 228' may be positioned radially inward (e.g., in the —Y direction) of the mounting flange 185. For example, the disk 220' may have a disk body 226' that defines a metal matrix cavity 227' therethrough. The metal matrix composite 228' may be positioned within a metal matrix cavity 227' of the disk body 226' so as to be encased within. As depicted, the mounting projection 224' may be part of the disk body 226' and may extend from one side of the disk 220' such that the disk 220' has a substantially "L-shaped" cross section.

The metal matrix composite 228' increases the strength of the disk 220', thereby allowing the disk size to be decreased and a reduced weight to be realized. The rotor blade assembly 102 may have difficulty meeting mechanical limits depending on the area of the airfoil blades 190 in the combustion gas flow path through the rotor blade assembly 102, and the rotational speed of the rotor blade assembly 102. An indication of this difficulty of the rotor blade assembly 102 meeting the mechanical limits may be determined by:

$$H=(Ro/12)*(\pi N/30),$$

where H is an operational limit of the rotor plate assembly which is a numerical representation of difficulty in meeting mechanical limits provided in ft/sec, Ro is the outer radius (inch) of the airfoil blades 190 of the rotor blade assembly 102 in the combustion gas flow path through the rotor blade assembly 102 at the exit of the LPT, and N is the rotational speed (RPM) of the rotor blade assembly 102. In embodiments, the operation of the rotor blade assembly 102 may be limited to an operating range, H, from about 600 ft/s to about 1500 ft/s, or more specifically, about 900 ft/s to about 1200 ft/s. The metal matrix composite 228' increases the strength of the disk 220' thereby increasing the operating range, H, of the rotor blade assembly 102, as opposed to constructions having disks without a metal matrix composite. The operating range H of the disk 220 (without the metal matrix composite) of a generally equal size may be less than about 900 ft/s, such as on a range from about 400 ft/s to about 850 ft/s.

A metal matrix composite may include a composite material including a metal, and at least one other material being a metal, ceramic, or organic compound. For example, the fibers of the metal matrix composite may be carbon fibers thereby providing a low thermal expansion. Less thermal expansion may allow for improved mechanical and thermal compliance of the rotor blade assembly.

It should now be understood that embodiments of the present disclosure are directed to a rotor blade assembly may be a rotational assembly of the turbine engine to generate power and/or thrust. Rotor blade assemblies according to the present disclosure may generally include an airfoil blade (such as a plurality of airfoil blades) a lower blade carrier, an upper blade carrier, and an outer drum. For example, the airfoil blade may include an inner diameter end, arranged toward a central axis of the turbine engine and an outer diameter end extending away from the central axis. The lower blade carrier may be coupled to the inner diameter end of the airfoil blade and rigidly coupled to a disk via a pin. The upper blade carrier may be coupled to the outer diameter end of the airfoil blade. The outer drum may be coupled to the upper blade carrier via a radial joint, wherein the radial joint supports radial motion of the upper blade carrier relative to the central axis extending through the center of the rotor blade assembly. As noted above, the drum may provide a high mass, which rotates at a higher radius than a free hoop radius, which may provide undesirable stresses within a turbine engine. To alleviate the stresses introduced by the rotating drum, the disk, which also rotates at a smaller diameter than the drum, provides a more centrally located mass to balance the movement and stresses introduced by the motion of the drum. The present embodiments may include a rigid connection between the lower blade carrier and the disk through the pin, and may allow for operation of the rotor assembly in more strenuous thermal and/or speed conditions, which may not be tolerated by more conventional flexible joints. Using a pinned disk may further allow the rotor assembly to meet the Campbell Diagram for Airfoils by providing a more rigid coupling. As will be described in greater detail herein, embodiments may also provide improved stress through the airfoil blades. For example, the radial joint may allow the airfoil blade to extend and/or retract radially in response to thermal expansion, which may allow for improved system stress management. In further embodiments, integrated cooling channels may provide unique cooling to allow for improved thermal management.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the present disclosure are provided by the subject matter of the following clauses:

A rotor blade assembly for a turbine engine, comprising: an airfoil blade comprising an inner diameter end and an outer diameter end; a lower blade carrier coupled to the inner diameter end of the airfoil blade and rigidly coupled to a disk via a pin; an upper blade carrier coupled to the outer diameter end of the airfoil blade; and an outer drum coupled to the upper blade carrier via a radial joint, wherein the radial joint supports radial motion of the upper blade carrier relative to an axis extending through a center of the rotor blade assembly.

The rotor blade assembly of any preceding clause, further comprising an outer shroud, wherein the outer shroud and the upper blade carrier are coupled to the outer drum via a centering rabbet and a spline joint, spaced from the radial joint in a longitudinal direction.

The rotor blade assembly of any preceding clause, wherein the pin includes a first locking component and a second locking component arranged along a longitudinal axis of the pin, each locking component comprising a first angled surface and a second angled surface, the second angled surface of the first locking component is engaged with the first angled surface of the second locking component in an overlapping configuration.

The rotor blade assembly of any preceding clause, wherein a first opening is formed at the outer diameter end of the airfoil blade, a second opening is formed at the inner diameter end of the airfoil blade, and a cooling channel is defined through the airfoil blade from the outer diameter end to the inner diameter end.

The rotor blade assembly of any preceding clause, further comprising an encasement extending around the disk, the encasement comprising an interior surface adjacent the disk, a plurality of fins extending from the interior surface toward the disk, and a curvilinear shell comprising two or more portions that couple to one another to substantially enclose the disk therein, the curvilinear shell comprising an airflow bore extending therethrough.

The rotor blade assembly of any preceding clause, further comprising an inner rotor spaced radially inward of the disk, the inner rotor comprising a channel formed therein that is aligned with the airflow bore of the curvilinear shell.

The rotor blade assembly of any preceding clause, wherein: a spacing between the encasement and the disk defines an airflow cavity; and an airflow path through the rotor blade assembly is defined by the cooling channel, the first opening, the second opening, the airflow cavity, the airflow bore of the curvilinear shell, and the channel of the inner rotor.

A rotor blade assembly for a turbine engine, comprising: an upper blade carrier, including a forearm extension extending in a longitudinal direction and an aft arm extension extending in the longitudinal direction opposite the forearm extension; a lower blade carrier; an airfoil blade comprising an outer diameter end coupled to the upper blade carrier and an inner diameter end coupled to the lower blade carrier; a disk rigidly coupled to the lower blade carrier via a pin; and an outer drum coupled to the forearm extension of the upper blade carrier defining a radial joint, wherein the radial joint supports radial motion of the upper blade carrier relative to an axis extending through a center of the rotor blade assembly.

The rotor blade assembly of any preceding clause, further comprising: an outer shroud comprising an aft projection comprising a locating surface, wherein: the upper blade carrier comprises a centering rabbet comprising a concave surface and coupled to the aft arm extension; and the locating surface contacts the concave surface to restrict movement of the upper blade carrier in the longitudinal direction.

The rotor blade assembly of any preceding clause, wherein: the outer drum defines a spline mounting recess; the upper blade carrier comprises a spline coupled to the aft arm extension; the aft projection comprises an engagement surface; the spline and the aft projection extend into the spline mounting recess and define a spline joint; the spline contacts the engagement surface to limit movement of the aft arm extension in a radial direction.

The rotor blade assembly of any preceding clause, wherein: the outer shroud comprises a fore projection; the outer drum comprises a forearm engagement portion and an aft arm engagement portion; a fore projection mounting recess and a forearm mounting recess are formed in the forearm engagement portion, and the spline mounting recess is formed in the aft arm engagement portion; the fore projection is positioned within the fore projection mounting recess; the forearm extension is positioned within the forearm mounting recess; and the aft projection and the aft arm extension are positioned within the spline mounting recess.

The rotor blade assembly of any preceding clause, wherein the upper blade carrier comprises a protrusion comprising an engagement surface that contacts the outer drum to limit movement of the upper blade carrier in the longitudinal direction.

The rotor blade assembly of any preceding clause, wherein: the airfoil blade comprises a first opening formed at the outer diameter end of the airfoil blade, a second opening is formed at the inner diameter end of the airfoil blade, and a cooling channel is defined through the airfoil blade from the outer diameter end to the inner diameter end; an encasement encloses the disk and comprises an interior surface adjacent the disk and comprising a plurality of fins extending from the interior surface toward the disk; a spacing between the encasement and the disk defines an airflow cavity; and an airflow path is defined by the cooling channel, the first opening, the second opening, and the airflow cavity.

A rotor blade assembly for a turbine engine, comprising: a lower blade carrier comprising a mounting flange; an airfoil blade comprising an outer diameter end and an inner diameter end, the outer diameter end coupled to the lower blade carrier, and the airfoil blade extending radially from the lower blade carrier toward the outer diameter end; a disk; a bore extending through the mounting flange and the disk; and a pin extending through the bore, wherein the pin includes a shank and a self-locking assembly circumferentially surrounding the shank to rigidly couple the lower blade carrier to the disk.

The rotor blade assembly of any preceding clause, wherein the self-locking assembly includes a first locking component and a second locking component arranged along a longitudinal axis of the pin, each locking component comprising a first angled surface and a second angled surface, the second angled surface of the first locking component is engaged with the first angled surface of the second locking component in an overlapping configuration.

The rotor blade assembly of any preceding clause, wherein the first and second angled surfaces of the first locking component and the first and second angled surfaces of the second locking component are oblique to the longitudinal axis.

The rotor blade assembly of any preceding clause, wherein: the pin comprises a head and an end cap, the shank extending between and coupled to the head and the end cap; and the head and the end cap compress the first locking component and the second locking component, thereby pressing one of the first locking component and the second locking component in a radial outward direction, and the other of the first locking component and the second locking component in a radially inward direction.

The rotor blade assembly of any preceding clause, further comprising an inner rotor spaced radially inward of the disk, the inner rotor comprising a channel formed therein, wherein a first opening is formed at the outer diameter end of the airfoil blade, a second opening is formed at the inner diameter end of the airfoil blade, and a cooling channel is defined through the airfoil blade from the outer diameter end to the inner diameter end; an encasement encloses the disk and comprises an interior surface adjacent the disk and comprising a plurality of fins extending from the interior surface toward the disk; a spacing between the encasement and the disk defines an airflow cavity; and an airflow path is defined by the cooling channel, the first opening, the second opening, the airflow cavity, and the channel of the inner rotor.

The rotor blade assembly of any preceding clause, further comprising: an outer shroud comprising an aft projection comprising an engagement surface and a locating surface, and a fore projection; an outer drum defining a fore projection mounting recess, a forearm mounting recess, and a spline mounting recess; an upper blade carrier coupled to the outer diameter end of the airfoil blade and comprising a forearm extension extending in a longitudinal direction, an aft arm extension extending in the longitudinal direction opposite the forearm extension, a centering rabbet coupled to the aft arm extension, and a spline coupled to the aft arm extension, wherein: the fore projection extends into the fore projection mounting recess; the centering rabbet comprises a concave surface; the locating surface contacts the concave surface to restrict movement of the upper blade carrier in the longitudinal direction; the spline contacts the engagement surface, where the aft projection and the spline extend into the spline mounting recess, defining a spline joint; the spline joint limits movement of the aft projection in an radial direction; and the forearm extension extends into the forearm mounting recess, defining a radial joint.

The rotor blade assembly of any preceding clause, wherein the outer drum comprises a forearm engagement portion and an aft arm engagement portion, the forearm engagement portion defining the fore projection mounting recess and the forearm mounting recess, and the aft arm engagement portion defining the spline mounting recess.

The rotor blade assembly of any preceding clause, comprising: a hanger body including the forearm extension extending longitudinally from the hanger body, and the aft arm extension extending longitudinally from the hanger body opposite the forearm extension.

The rotor blade assembly of any preceding clause, wherein: the hanger body is sloped radially such that the forearm extension is positioned radially closer to a central axis than the aft arm extension, the forearm extension extends longitudinally from the hanger body a distance beyond a first edge of the hanger body, and the aft arm extension extends longitudinally from the hanger body a distance beyond a second edge of the hanger body opposite the first edge.

The rotor blade assembly of any preceding clause, wherein: the lower blade carrier includes a lower blade carrier body and an inner diameter mounting flange extending radially inward from the lower blade carrier body, the width of the inner diameter mounting flange being less than a width of the airfoil blade, and the disk including a main body and mounting projection extending radially outward from the main body, the mounting projection being coupled to the inner diameter mounting flange such that the disk is positioned between the first edge and the second edge of the airfoil blade.

What is claimed is:

1. A rotor blade assembly for a turbine engine, comprising:

an airfoil blade comprising an inner diameter end and an outer diameter end;

a lower blade carrier coupled to the inner diameter end of the airfoil blade and rigidly coupled to a disk via a pin;

an upper blade carrier coupled to the outer diameter end of the airfoil blade;

an outer drum coupled to the upper blade carrier via a radial joint, wherein the radial joint supports radial motion of the upper blade carrier relative to an axis extending through a center of the rotor blade assembly; and an outer shroud, wherein the outer shroud is coupled to the outer drum via a centering rabbet and a spline joint, the outer shroud being spaced from the radial joint in a longitudinal direction;

wherein the pin includes a first locking component and a second locking component arranged along a longitudinal axis of the pin, each locking component comprising a first angled surface and a second angled surface that is angled in an opposite direction to the first angled surface, the second angled surface of the first locking component being engaged with the first angled surface of the second locking component in an overlapping configuration.

2. The rotor blade assembly of claim 1, wherein a first opening is formed at the outer diameter end of the airfoil blade, a second opening is formed at the inner diameter end of the airfoil blade, and a cooling channel is defined through the airfoil blade from the outer diameter end to the inner diameter end.

3. The rotor blade assembly of claim 2, further comprising an encasement extending around the disk, the encasement comprising an interior surface adjacent the disk, a plurality of fins extending from the interior surface toward the disk, and a curvilinear shell comprising two or more portions that couple to one another to enclose the disk therein, the curvilinear shell comprising an airflow bore extending there-through.

4. The rotor blade assembly of claim 3, further comprising an inner rotor spaced radially inward of the disk, the inner rotor comprising a channel formed therein that is aligned with the airflow bore of the curvilinear shell.

5. The rotor blade assembly of claim 4, wherein:

a spacing between the encasement and the disk defines an airflow cavity; and an airflow path through the rotor blade assembly is defined by the cooling channel, the first opening, the second opening, the airflow cavity, the airflow bore of the curvilinear shell, and the channel of the inner rotor.

6. A rotor blade assembly for a turbine engine, comprising:

an upper blade carrier, including a forearm extension extending in a longitudinal direction and an aft arm extension extending in the longitudinal direction opposite the forearm extension;

a lower blade carrier;

an airfoil blade comprising an outer diameter end coupled to the upper blade carrier and an inner diameter end coupled to the lower blade carrier;

a disk rigidly coupled to the lower blade carrier via a pin;

an outer drum coupled to the forearm extension of the upper blade carrier defining a radial joint, wherein the radial joint supports radial motion of the upper blade carrier relative to an axis extending through a center of the rotor blade assembly; and an outer shroud comprising an aft projection comprising a locating surface, wherein:

the upper blade carrier comprises a centering rabbet comprising a concave surface and coupled to the aft arm extension;

the locating surface contacts the concave surface to restrict movement of the upper blade carrier in the longitudinal direction;

the outer drum defines a spline mounting recess;

the upper blade carrier comprises a spline coupled to the aft arm extension;

the aft projection comprises an engagement surface;

the spline and the aft projection extend into the spline mounting recess and define a spline joint; and the spline contacts the engagement surface to limit movement of the aft arm extension in a radial direction.

7. The rotor blade assembly of claim 6, wherein:

the outer shroud comprises a fore projection;

the outer drum comprises a forearm engagement portion and an aft arm engagement portion;

a fore projection mounting recess and a forearm mounting recess are formed in the forearm engagement portion, and the spline mounting recess is formed in the aft arm engagement portion;

the fore projection is positioned within the fore projection mounting recess;

the forearm extension is positioned within the forearm mounting recess; and the aft projection and the aft arm extension are positioned within the spline mounting recess.

8. The rotor blade assembly of claim 6, wherein the upper blade carrier comprises a protrusion comprising an engagement surface that contacts the outer drum to limit movement of the upper blade carrier in the longitudinal direction.

9. The rotor blade assembly of claim 6, wherein:

the airfoil blade comprises a first opening formed at the outer diameter end of the airfoil blade, a second opening is formed at the inner diameter end of the airfoil blade, and a cooling channel is defined through the airfoil blade from the outer diameter end to the inner diameter end;

an encasement encloses the disk and comprises an interior surface adjacent the disk and comprising a plurality of fins extending from the interior surface toward the disk;

a spacing between the encasement and the disk defines an airflow cavity; and an airflow path is defined by the cooling channel, the first opening, the second opening, and the airflow cavity.

10. A rotor blade assembly for a turbine engine, comprising:

a lower blade carrier comprising a mounting flange;

an airfoil blade comprising an outer diameter end and an inner diameter end, the inner diameter end coupled to the lower blade carrier, and the airfoil blade extending radially from the lower blade carrier toward the outer diameter end;

a disk;

a bore extending through the mounting flange and the disk; and a pin extending through the bore, wherein the pin includes a shank and a self-locking assembly circumferentially surrounding the shank to rigidly couple the lower blade carrier to the disk;

wherein the self-locking assembly includes a first locking component and a second locking component arranged along a longitudinal axis of the pin, each locking component comprising a first angled surface and a second angled surface, the second angled surface of the first locking component being engaged with the first angled surface of the second locking component in an overlapping configuration, and the first and second angled surfaces of the first locking component and the first and second angled surfaces of the second locking component are oblique to the longitudinal axis.

11. The rotor blade assembly of claim 10, wherein:

the pin comprises a head and an end cap, the shank extending between and coupled to the head and the end cap; and the head and the end cap compress the first locking component and the second locking component, thereby pressing one of the first locking component and the second locking component in a radial outward direction and the other of the first locking component and the second locking component in a radially inward direction.

12. The rotor blade assembly of claim 10, further comprising an inner rotor spaced radially inward of the disk, the inner rotor comprising a channel formed therein, wherein a first opening is formed at the outer diameter end of the airfoil blade, a second opening is formed at the inner diameter end of the airfoil blade, and a cooling channel is defined through the airfoil blade from the outer diameter end to the inner diameter end;

an encasement encloses the disk and comprises an interior surface adjacent the disk and comprising a plurality of fins extending from the interior surface toward the disk;

a spacing between the encasement and the disk defines an airflow cavity; and an airflow path is defined by the cooling channel, the first opening, the second opening, the airflow cavity, and the channel of the inner rotor.

13. The rotor blade assembly of claim 10, further comprising:

an outer shroud comprising an aft projection comprising an engagement surface and a locating surface, and a fore projection;

an outer drum defining a fore projection mounting recess, a forearm mounting recess, and a spline mounting recess;

an upper blade carrier coupled to the outer diameter end of the airfoil blade and comprising a forearm extension extending in a longitudinal direction, an aft arm extension extending in the longitudinal direction opposite the forearm extension, a centering rabbet coupled to the aft arm extension, and a spline coupled to the aft arm extension, wherein:

the fore projection extends into the fore projection mounting recess;

the centering rabbet comprises a concave surface;

the locating surface contacts the concave surface to restrict movement of the upper blade carrier in the longitudinal direction;

the spline contacts the engagement surface, where the aft projection and the spline extend into the spline mounting recess, defining a spline joint;

the spline joint limits movement of the aft projection in a radial direction; and the forearm extension extends into the forearm mounting recess, defining a radial joint.

14. The rotor blade assembly of claim 13, wherein the outer drum comprises a forearm engagement portion and an aft arm engagement portion, the forearm engagement portion defining the fore projection mounting recess and the forearm mounting recess, and the aft arm engagement portion defining the spline mounting recess.

* * * * *